(12) United States Patent
Huston et al.

(10) Patent No.: US 6,307,212 B1
(45) Date of Patent: *Oct. 23, 2001

(54) HIGH RESOLUTION IMAGING USING OPTICALLY TRANSPARENT PHOSPHORS

(75) Inventors: Alan L. Huston; Brian L. Justus, both of Springfield, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/310,681

(22) Filed: Apr. 1, 1999

(51) Int. Cl.[7] ................................................ G01T 1/115
(52) U.S. Cl. .................. 250/580; 250/484.4; 250/483.1
(58) Field of Search .................................. 250/580, 981, 250/484.4, 483.1, 484.2, 484.3, 484.5, 337; 252/301.4 R, 301.6 S

(56) References Cited

U.S. PATENT DOCUMENTS 5,585,640 * 12/1996 Huston et al. ..................... 250/483.1
5,811,822 * 9/1998 Huston et al. ..................... 250/484.4

* cited by examiner

*Primary Examiner*—Scott J. Sugarman
*Assistant Examiner*—Richard Hanig
(74) *Attorney, Agent, or Firm*—John J.Karasek; Amy L.Ressing

(57) ABSTRACT

Images are formed by exposing optically transparent, optically stimulable luminescent glasses including luminescent centers and trapping centers, to patterned, ionizing radiation. The images may be read immediately, using scintillation, or may be stored in the glasses for subsequent reading using optically stimulated detrapping of stored charges.

22 Claims, 2 Drawing Sheets

HIGH RESOLUTION IMAGING USING OPTICALLY TRANSPARENT PHOSPHORS

BACKGROUND OF THE INVENTION

1. Field of the Invention

The present invention relates generally to high resolution imaging, and more specifically to high resolution imaging of objects using sources of ionizing radiation.

2. Description of the Background Art

A variety of methods exist for imaging objects using UV, x-ray, and other ionizing radiation sources. These methods have used photographic films, phosphor screens in conjunction with CCD cameras, and thermoluminescent or optically stimulable luminescent phosphor powders in conjunction with a scanning laser readout system. In these techniques, the dimensions of the photosensitive grains in the film or phosphor and scattering effects limit the obtainable resolution. Grain sizes in typical phosphors are on the order of tens of microns, and crushing the phosphor to sub micron dimensions often results in a loss of phosphor activity. Grain sizes in photographic films range from 0.15 $\mu m^2$ for very slow speed (low sensitivity) film to 2.6 $\mu m^2$ for very high speed (high sensitivity) film. For film, the resolution is from 10 to 100 times the grain size because of the chemistry involved in the developing process. Problems with photographic films include the necessity for chemical developing, nonlinear response, limited dynamic range and single use. The resolution for direct imaging using a CCD camera is determined by the individual pixel size of the CCD array and the magnification factor used for collecting the image. Modern CCD cameras have pixel dimensions of approximately 8 $\mu m \times 8 \mu m$.

SUMMARY OF THE INVENTION

Accordingly, it is an object of this invention to provide improved spatial resolution when imaging objects using high energy sources such as uv, x-ray, and γ-ray photon sources, and ionizing radiation particles.

It is another object of the present invention to provide a media for image storage and a method to readout images without the need for photographic development.

It is yet another object of the present invention to provide a reusable media, with a linear response and good dynamic range, for the storage and readout of images made by exposing objects to high energy photon and particle sources.

These and additional objects of the invention are accomplished by exposing optically transparent, optically stimulable luminescent glasses including luminescent centers and trapping centers, to a projection formed by directing ionizing radiation at an object (Throughout this specification and the claims that follows, the terms "projection" encompasses forms created by radiation transmitted through an object, forms created by radiation transmitted around an object, and/or forms created by radiation scattered from an object. Typically, projections imaged according to this invention are formed by the interpositioning of an object between the source of ionizing radiation and the optically stimulable luminescent glass, which will hereinafter be referred to as a backside projection). These optically stimulable luminescent glasses are fully described in U.S. Pat. No. 5,811,822, issued Sep. 22, 1998 and entitled "OPTICALLY TRANSPARENT, OPTICALLY STIMULABLE GLASS COMPOSITES FOR RADIATION DOSIMETRY" (the entireties of which are incorporated by reference herein for all purposes). In these glasses, the trapping centers are capable of storing charges for extended periods of time. The trapped charges may be electrons or holes that were generated upon exposure to ionizing radiation. The trapped charges may be optically stimulated to recombine by the application of light at optical frequencies, resulting in the emission of light energy at higher optical frequencies. This optical stimulation is direct, i.e., it does not involve conversion of the optical excitation energy to thermal energy that heats the glass sufficiently to detrap the electron. This direct optical stimulation may, however, include optical absorption with the release of a phonon that participates in phonon-assisted detrapping of an electron. This direct optical stimulation process is known as optically-stimulated luminescence (OSL). In several embodiments, the glass (e.g., fused quartz, fused silica, alumina glass, or borate glass) matrix includes Cu (typically $Cu^{1+}$) as an activator (sometimes referred to as a "dopant" in the glass). In other embodiments, the glass matrix includes an activator/co-activator pair of samarium and another rare earth element. In other alternative embodiments, the glass (e.g., silica, alumina, or borate glass) matrix is doped with ZnS and copper, lead, manganese, or cerium. In yet another embodiment, a glass (e.g., silica, alumina, or borate glass) matrix is doped with Cu or Ce ions in the absence of a metal sulfide component, or even in the absence of any sulfide component. A glass is considered essentially free of a component if the glass lacks an amount of that component sufficient to significantly alter the optical stimulability or radiation sensitiveness of the glass.

The OSL glasses described above may also scintillate when exposed to ionizing radiation. This scintillation advantageously permits the present invention to also provide real time images produced by exposure of the glass to ionizing radiation. Of course, the specific OSL glass used may be selected to maximize scintillation or optically-stimulated luminescence The resulting image may be either real-time, using the prompt luminescence component of the phosphor luminescence, or it may be stored in the media, using the charge trapping and storage capability of the glass.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Figure 1:
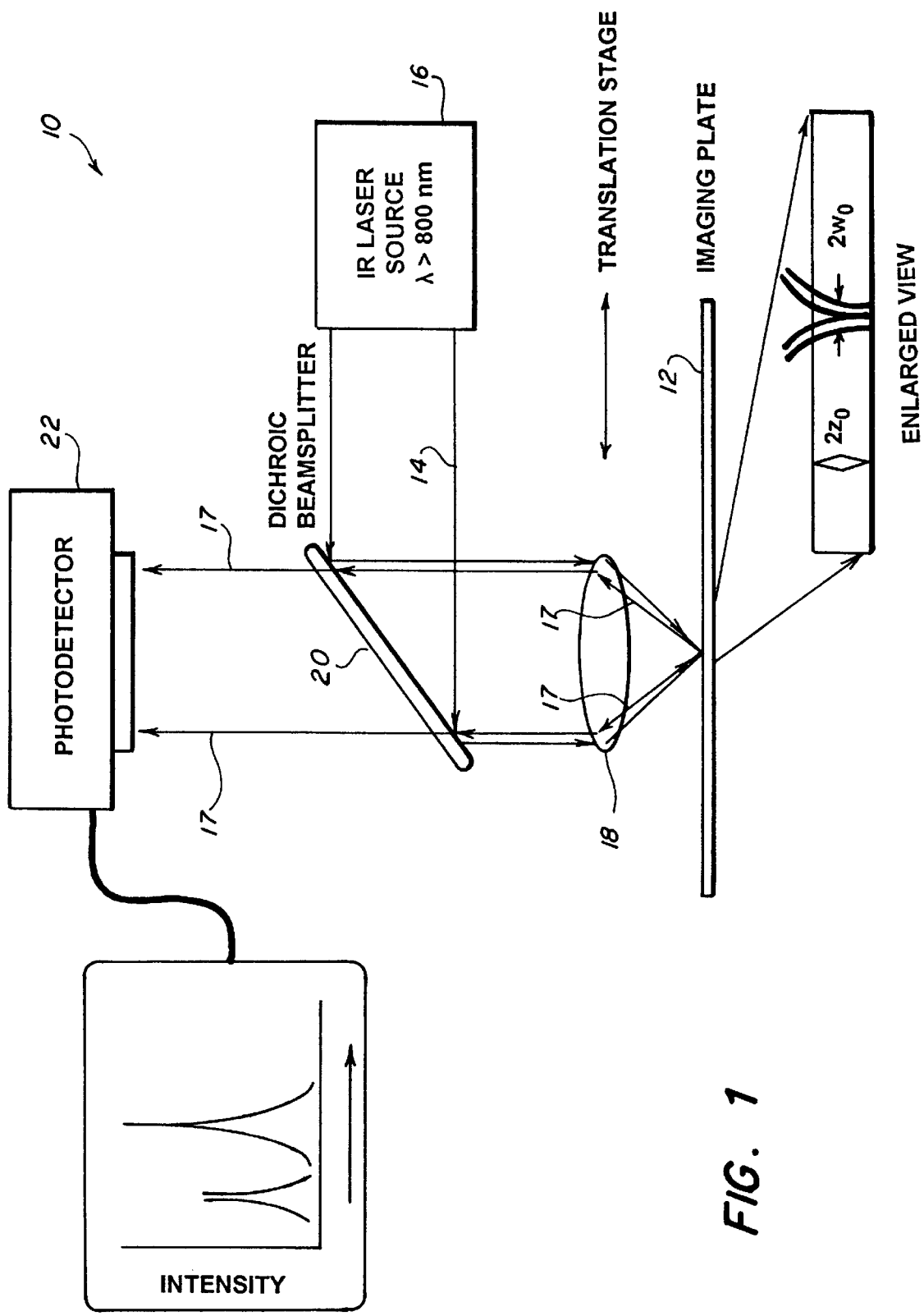
FIG. 1 shows a schematic of a typical laser scanned readout system 10 according to the presently claimed invention.

The optically-stimulated luminescent imaging system described in this invention utilizes a novel, semiconductor- and/or metal ion-doped glass material that was recently developed by the present inventors and described in the U.S. Pat. Nos. 5,811,822 and in 5,585,640 to Huston et al., the entirety of which is also incorporated herein by reference for all purposes. Basically, Huston et al. '822, describes a class of optically transparent, optically stimulated glasses and details three embodiments of that class, along with various methods of preparation.

Exposure of those composite glass materials to ionizing radiation, such as deep ultraviolet, x-ray or gamma radiation, results in the formation of trapped electrons in the composite glass material. The electrons remain trapped until the glass material is exposed to light at a stimulating wavelength. Upon exposure to light at a stimulating wavelength, the glass emits a luminescent signal. Additionally, these glass materials scintillate upon exposure to ionizing radiation to provide a real-time image. To provide the best possible resolution, the glass material should be used in the form of a plate or sheet sufficiently thin to satisfy the conditions imposed for diffraction limited optics.

When used for real-time imaging, the present invention employs those composite glass materials in a manner analogous to the use of a phosphor screen in conventional methods that use a phosphor screen and a CCD camera. Basically, the glass materials of the present invention convert X-rays to photons by scintillation. A conventional lens-coupled camera system, coupled to a light sensor, for example a CCD sensor, images the photons. The light sensor and its associated conventional software convert the image to digital data, which may then be stored, printed or otherwise processed.

The ability of the Huston et al. optically transparent, optically stimulated glasses to trap charges upon exposure to u.v., x-rays or other ionizing radiation allows an alternative to real-time imaging methods. Trapped charges remain trapped until the phosphor is exposed to an infrared light source that is capable of releasing the traps and stimulating the recombination of the charges at a luminescent recombination center. The luminescence wavelength is in the visible, and may be recorded with a common, visible-light-sensitive photodetector. For imaging applications, the ir stimulation light may come from a laser source that is focused to a small spot and scanned over the surface of the glass plate. Alternatively, a selected region of the glass plate may be uniformly illuminated with a lamp that is filtered to provide only light at wavelengths in the infrared or near infrared. This light stimulates luminescent recombination in the visible that is detected and imaged with a CCD camera.

In addition to the use of monolithic clear OSL glass sheets for recording images, the OSL glass may also be powdered and dispersed in a film such as a sol gel glass film or a polymer film. In the case of a sol gel film, a fine, e.g., one to two micron (400 mesh) powder can be suspended in an acidic solution consisting of an appropriate vehicle, such as tetraethyl-orthosilicate, methanol, and water, for the formation of thin glass film by a sol-gel process.. The glass powder may be used, for example, in a proportion of between about 1% and about 10% by weight. A thin film can be formed by dipping a substrate material into the sol-gel solution and then withdrawing the substrate at a controlled rate. The substrate with the applied film is then placed in a furnace and heated to transform the organosilicate film into a purely inorganic film. A film prepared in this way will typically have a thickness of about 1 to about 2 microns and will appear essentially transparent due to the refractive index match between the silica powder and the sol-gel-based film.

Instead of using a sol-gel solution, the powdered OSL glass may be dispersed in a polymer solution and then coated onto a substrate using the dip-coating technique described above. The polymer solution can contain any optically transparent polymer or mixture of polymers that can be dissolved in a solvent to an extent between about 1% and about 50% by weight. Typically, a polymer solution with a dissolved solids content of about 5% to about 20% by weight provides good optical quality film on a substrate material. A mixture of polymers may be used to reduce the refractive index difference between the polymer and the glass powder material thereby reducing scattering within the film. The polymer-glass powder solution may consist, for example, of a mixture of 1% to 50% by weight of polymethylmethacrylate dissolved in methyl ethyl ketone with the glass powder used in a proportion of between 1% and 50% by weight. The thickness of the film can be controlled by varying the viscosity of the polymer solution. If desired, polymer-glass films can be prepared on or as flexible substrates, for example, by spin-coating a flexible substrate with the OSL glass powder in either the sol-gel or the polymer matrix, or by casting or extrusion of the sol-gel or polymer matrix as a free-standing film or sheet, to provide a flexible imaging medium. Such a flexible imaging medium could be useful for applications such as dental x-ray imaging.

The use of OSL powders still provides significant improvement in the spatial resolution of an image compared to the current art. As stated in the Description of the Background Art, the spatial resolution that can be achieved using current techniques is on the order of tens of microns. Crushing inorganic phosphors to smaller size diminishes their activity and hence, their sensitivity. OSL glass powders having grains sizes of 1 to 2 $\mu$m retain their sensitivity. In addition, the index of refraction of many OSL glass powders used in the present invention is ~1.4. Therefore, polymer or sol-gel films containing dispersed OSL glass powder will be optically transparent since many suitable polymer and sol-gel glass hosts can be selected that have an index of refraction of 1.4. The indices of refraction of inorganic phosphors are typically larger (generally greater than about 3) and inorganic phosphor powders dispersed in a polymer or sol-gel glass film will not be index-matched. The resulting films using inorganic phosphors would scatter light to a significant degree, thereby limiting the achievable spatial resolution of the stored image.

FIG. 1 shows a schematic of a typical laser scanned readout system 10 according to the presently claimed invention. For the highest resolution images, the thickness of imaging plate 12 (for example, a sheet of the Huston et al. '822 glass) must satisfy the conditions imposed for diffraction limited optics. Specifically, the thickness of imaging plate 12 should be limited to $2*z_0$, where:

$z_0=(nw_0^2/l)$, n is the index of refraction of the glass, l is the wavelength of the light, and $w_0$ is the radius of the laser spot size which is given by:

$w_0=0.6351 f/d$, f is the focal length of lens 18 and d is the diameter of the input, collimated light beam at lens 18.

Referring again to FIG. 1, when laser beam 14 from source 16 is focused by lens 18 onto an exposed area of the imaging plate, the resulting stimulated luminescence 17 is collected by lens 18, collimated, and directed back through a dichroic beamsplitting mirror 20 and onto photodetector 22. The intensity of the signal is proportional to the exposure intensity. An image in exposed imaging plate 12 is then obtained by translating image plate 12 in the plane of the focus of lens 18 and measuring the luminescence 17 as a function of the position of plate 12. The glass material used for the imaging plate has a demonstrated dynamic range of response of over 7 orders of magnitude. The combination of the dynamic range and the optical transparency provide for unprecedented optical image resolution.

Figure 2:
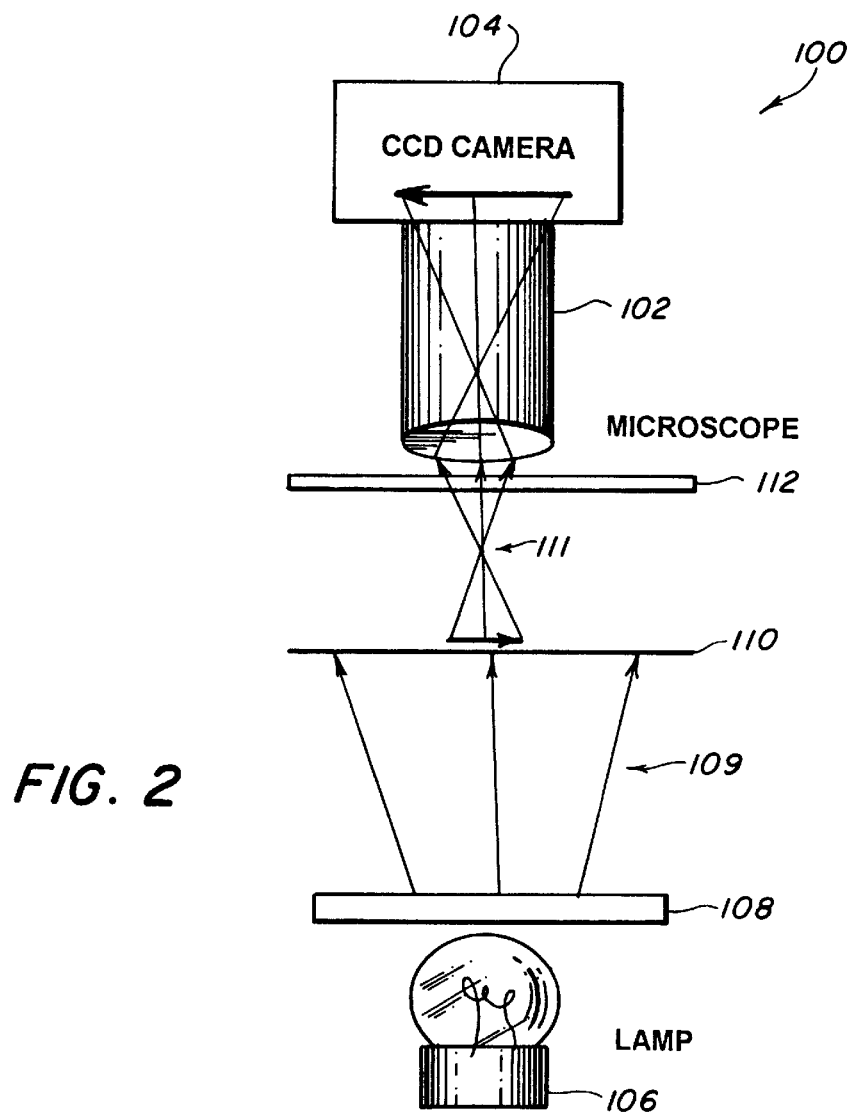
FIGS. 2A & 2B shows an alternative embodiment of a lamp illuminated readout system according to the present invention.

FIG. 2 shows an alternative system 100 of the present invention using microscope 102 and CCD camera 104. Lamp 106 is a broadband incoherent light source such as a tungsten lamp. The output of lamp 106 is spectrally filtered by optical glass filter 108 that transmits infrared and near infrared radiation 109. The infrared radiation 109 uniformly illuminates imaging plate 110, stimulating visible luminescence 111 from those regions of imaging plate 110 that were previously exposed to ionizing radiation. The colored glass filter 112 blocks the stimulation light 109 from interfering with the detection of the luminescence 111. The lens or microscope objective 102 images light 111 from all or part of imaging plate 110 onto CCD camera 104. The magnification of the image is determined by the characteristics of the lens or microscope 102. The arrows show how the image may be inverted and magnified, without distortion, by the microscope objective.

Figure 3:
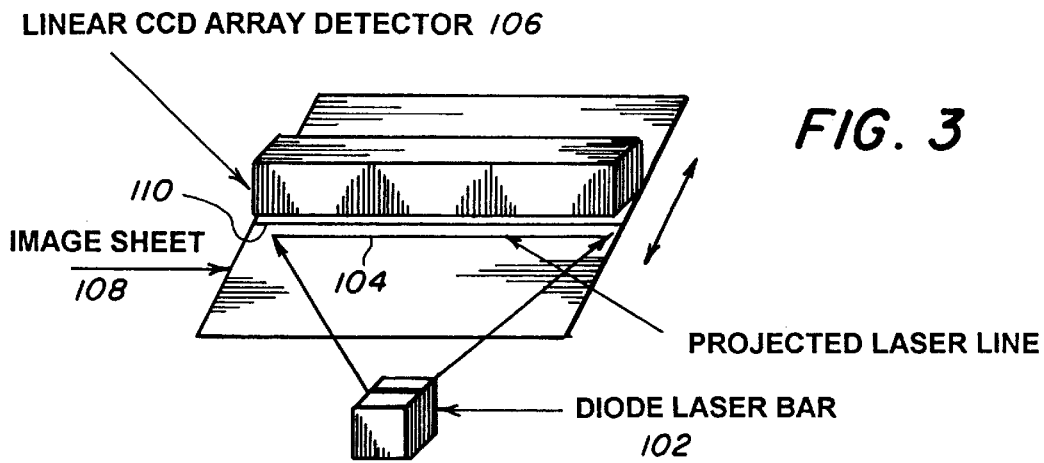
FIG. 3 shows another alternative embodiment of a laser scanned readout system according to the present invention.

An image stored on an OSL sheet may be read out using a device such as a modified flatbed scanner. As shown in FIG. 3, the light output from an OSL stimulating light source, such as a diode laser bar 102, can be projected to form an extended narrow line 104, and used in conjunction with an extended linear CCD array 106 to record an image stored in an OSL sheet 108. OSL sheet 108 can be translated with respect to light source 102 and CCD array 106, or light source 102 and CCD array 106 can be translated together while OSL sheet 108 remains stationary. A filter 110 can be placed in front of CCD array 108 to filter out the stimulation light and only allow passage of the OSL signal light.

The present invention has a number of useful applications. For example, the present invention is useful in quality control for photolithography. Photolithographic processing methods for integrated circuit chips are now capable of submicron feature sizes. At the present time, before a production run is undertaken, a test run is conducted to assure that all of the lithographic parameters are within specifications, including the beam quality and the mask integrity. This is a very time consuming process, requiring that the system be opened up to remove the test wafer, followed by etching and microscopic analysis of the circuits. The present invention provides a method for determining the beam quality and a high resolution image of the circuit without having to wait for a lengthy wafer processing procedure.

For nondestructive evaluation applications, an object may be placed on top of a thin sheet of the optically transparent phosphor glass and then exposed to an x-ray source. Any inhomogeneities present inside of the object, such as bubbles or cracks, or material differences such as metal lines will appear as contrast differences in the phosphor image. The outstanding dynamic range of the image storage material will allow for unprecedented detection capabilities.

Medical imaging applications include mammography and osteoporosis screening. The enhanced resolution and dynamic range will provide improved diagnostics for detecting and distinguishing between fibrous cysts and cancerous tumors in breast tissue and allow very precise measures of variations in bone density.

The present invention also has applications in stereotactic imaging: High precision radiotherapy procedures require extensive modeling using phantoms for treatment planning. Part of the planning process involves obtaining images of the radiation beam profile near the focal region. The glass imaging plates of the present invention provide significant advantages over currently used films. The glasses offer orders of magnitude improvements in dynamic range and are reusable.

Obviously, many modifications and variations of the present invention are possible in light of the above teachings. It is therefore to be understood that, within the scope of the appended claims, the invention may be practiced otherwise than as specifically described.

What is claimed is:

1. A system for high resolution imaging of an object, comprising:

a source of ionizing radiation directed toward the object so as to form a projection of said object;

a sheet of an optically transparent, optically stimulable glass, said sheet being positioned so as to be exposed to said projection, said optically transparent, optically stimulable glass being a glass matrix that includes luminescent centers and trapping centers, said trapping centers having the ability to store trapped charges until said glass matrix is exposed to an optical energy, said trapping centers being directly stimulable by said optical energy to cause said trapped charges to recombine and emit light energy.

2. The imaging system of claim 1, wherein said optically transparent, optically stimulable glass is selected from the group consisting of:

a glass matrix doped with an alkaline earth sulfide, Sm ions, and an additional dopant selected from the group consisting of Eu ions and Ce ions, said alkaline earth sulfide and said additional dopants being present in amounts sufficient to provide said glass with optically stimulable luminescence;

a glass matrix doped with ZnS and an additional dopant selected from the group consisting of Pb ions, Cu ions, and Mn ions, said ZnS and said additional dopant being present in an amount sufficient to provide said glass with optically stimulable luminescence; or an essentially metal sulfide-free glass comprising a glass matrix doped with an amount of Cu ions sufficient to provide said glass with optically stimulable luminescence.

3. The imaging system of claim 1, wherein said optically transparent, optically stimulable glass is an essentially metal sulfide-free glass comprising a glass matrix doped with an amount of Cu ions sufficient to provide said glass with optically stimulable luminescence.

4. A system for reading high resolution images of an object, comprising:

a sheet of an optically transparent, optically stimulable glass that includes luminescent centers and trapping centers, said trapping centers having the ability to store trapped charges, said optically stimulable glass having been exposed to ionizing radiation and having trapped charges, generated by said exposure, stored in said trapping centers;

a source of light, said source directing light upon said sheet, said light being of a wavelength that directly stimulates said trapped charges so as to cause said trapped charges to recombine and emit light; and a photodetector positioned to detect said emitted light.

5. The reading system of claim 4, wherein said photodetector is a charge-coupled device camera.

6. The readout system of claim 4, wherein said optically stimulable glass is selected from the group consisting of:

a glass matrix doped with an alkaline earth sulfide, Sm ions, and an additional dopant selected from the group consisting of Eu ions and Ce ions, said alkaline earth sulfide and said additional dopants being present in amounts sufficient to provide said glass with optically stimulable luminescence;

a glass matrix doped with ZnS and an additional dopant selected from the group consisting of Pb ions, Cu ions, and Mn ions, said ZnS and said additional dopant being present in an amount sufficient to provide said glass with optically stimulable luminescence; or an essentially metal sulfide-free glass comprising a glass matrix doped with an amount of Cu ions sufficient to provide said glass with optically stimulable luminescence.

7. The reading system of claim 4, wherein said optically transparent, optically stimulable glass is an essentially metal sulfide-free glass comprising a glass matrix doped with an amount of Cu ions sufficient to provide said glass with optically stimulable luminescence.

8. An imaging method for providing high resolution images of an object using ionizing radiation, comprising the steps of:

directing ionizing radiation at an object so that said ionizing radiation forms a projection of said object;

exposing a sheet of an optically transparent, optically stimulable glass to said projection, said optically transparent, optically stimulable glass including luminescent centers and trapping centers, said trapping centers having the ability to store trapped charges formed by exposure of said optically transparent, optically stimulable glass to said transmitted ionizing radiation.

9. The method of claim 8, wherein said optically transparent, optically stimulable glass converts said transmitted ionizing radiation to photons by scintillation, and further comprising the step of forming an image by imaging said photons onto a light sensor.

10. The method of claim 9, wherein said light sensor is a charge-coupled device sensor.

11. The method of claim 10, further comprising the step of converting said image into digital data.

12. The method of claim 8, further comprising the steps of:

directing excitation light upon said sheet, said excitation light being of a wavelength that directly stimulates said trapped charges so as to cause said trapped charges to recombine and emit light; and detecting said emitted light.

13. The method of claim 12, wherein said detecting step is performed by a charge-coupled device.

14. The method of claim 13 wherein said charge-coupled device is a linear charge-coupled device array, said excitation light is from a light source and is formed as a line of light directed toward said sheet and said sheet undergoes translation with respect to said light source and said array.

15. The method of claim 14, wherein said light source and said array are stationary.

16. The method of claim 14, wherein said sheet is stationary.

17. The method of claim 12, wherein said optically transparent, optically stimulable glass is selected from the group consisting of:

a glass matrix doped with an alkaline earth sulfide, Sm ions, and an additional dopant selected from the group consisting of Eu ions and Ce ions, said alkaline earth sulfide and said additional dopants being present in amounts sufficient to provide said glass with optically stimulable luminescence;

a glass matrix doped with ZnS and an additional dopant selected from the group consisting of Pb ions, Cu ions, and Mn ions, said ZnS and said additional dopant being present in an amount sufficient to provide said glass with optically stimulable luminescence; or an essentially metal sulfide-free glass comprising a glass matrix doped with an amount of Cu ions sufficient to provide said glass with optically stimulable luminescence.

18. The method of claim 15, wherein said optically transparent, optically stimulable glass is an essentially metal sulfide-free glass comprising a glass matrix doped with an amount of Cu ions sufficient to provide said glass with optically stimulable luminescence.

19. A system for high resolution imaging of an object, comprising:

a source of ionizing radiation directed toward the object so as to form a projection of said object;

a layer of optically transparent, optically stimulable glass powder dispersed within a film of a non-glass material, said layer being positioned so as to be exposed to said projection, said optically transparent, optically stimulable glass powder including luminescent centers and trapping centers, said trapping centers having the ability to store trapped charges until said glass is exposed to an optical energy, said trapping centers being directly stimulable by said optical energy to cause said trapped charges to recombine and emit light energy.

20. The method of claim 19, wherein said non-glass material is a sol-gel or a polymer.

21. The method of claim 20, wherein said non-glass material is a sol-gel.

22. The method of claim 20, wherein said non-glass material is a polymer.

* * * * *